(12) United States Patent
Tanaka (10) Patent No.: US 9,853,274 B2
(45) Date of Patent: Dec. 26, 2017

(54) SOLID BATTERY

(75) Inventor: Katsuhisa Tanaka, Anjyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 13/993,479

(22) PCT Filed: Feb. 24, 2011

(86) PCT No.: PCT/JP2011/054155
§ 371 (c)(1),
(2), (4) Date: Jun. 12, 2013

(87) PCT Pub. No.: WO2012/114497
PCT Pub. Date: Aug. 30, 2012

(65) Prior Publication Data
US 2013/0323568 A1   Dec. 5, 2013

(51) Int. Cl.
*H01M 2/18* (2006.01)
*H01M 2/08* (2006.01)
*H01M 10/0525* (2010.01)
*H01M 10/0565* (2010.01)
*H01M 10/0585* (2010.01)

(52) U.S. Cl.
CPC .............. *H01M 2/18* (2013.01); *H01M 2/08* (2013.01); *H01M 10/0525* (2013.01); *H01M 10/0565* (2013.01); *H01M 10/0585* (2013.01); *Y02T 10/7011* (2013.01)

(58) Field of Classification Search
None
See application file for complete search history.

(56) References Cited

U.S. PATENT DOCUMENTS 6,387,564 B1   5/2002   Yamashita et al.
2003/0129489 A1*  7/2003  Kamisuki .............. H01G 9/155
429/185

FOREIGN PATENT DOCUMENTS

| JP | A-59-196576 | 11/1984 |
| JP | A-2000-164178 | 6/2000 |
| JP | A-2010-092696 | 4/2010 |
| JP | A-2010-272368 | 12/2010 |
| WO | WO 98/38688 A1 | 9/1998 |

* cited by examiner

*Primary Examiner* — Barbara L Gilliam
*Assistant Examiner* — Adam A Arciero
(74) *Attorney, Agent, or Firm* — Oliff PLC (57) ABSTRACT

A solid battery has a first electrode layer, second electrode layer, and solid electrolyte layer disposed therebetween. A first insulating layer is disposed on an outer perimeter of the first electrode layer; a lamination face of the first electrode layer taking a lamination direction of the first electrode layer, the solid electrolyte layer, and the second electrode layer as a normal direction is smaller than that of the solid electrolyte layer; from the lamination direction, an outer edge of the solid electrolyte layer is positioned on the first electrode layer outer perimeter and an outer edge of the first insulating layer is positioned on an outer perimeter of the solid electrolyte layer; and the first electrode layer, the first insulating layer, and the solid electrolyte layer are disposed such that the outer edge of the first insulating layer and an end of the solid electrolyte layer contact each other.

6 Claims, 7 Drawing Sheets

SOLID BATTERY

TECHNICAL FIELD

The present invention relates to a solid battery having a pair of electrode layers and a solid electrolyte layer disposed between the pair of electrode layers.

BACKGROUND ART

A lithium-ion secondary battery (hereinafter sometimes simply referred to as a "battery") has characteristics that it has a higher energy density than other secondary batteries and can be operated at a high voltage. Therefore, it is used for information devices such as cellular phones as it can be easily reduced in size and weight; and nowadays there is an increasing demand for the lithium-ion secondary battery to be used as a power source for large-scale apparatuses such as electric vehicles and hybrid vehicles.

The lithium-ion secondary battery has a cathode layer and an anode layer (a pair of electrode layers), and an electrolyte layer disposed therebetween. For example, a non-aqueous liquid substance or a solid substance is known to be used as an electrolyte in the electrolyte layer. When a liquid electrolyte (hereinafter referred to as an "electrolytic solution") is used, it permeates into the cathode layer and the anode layer easily. Therefore, an interface can be formed easily between the electrolytic solution and the active material contained in the cathode layer and the anode layer, and the battery performance can be improved easily. However, since commonly used electrolytic solutions are flammable, it is necessary to mount a system to ensure safety. On the other hand, since solid electrolytes are nonflammable, the above system can be simplified. As such, a lithium-ion secondary battery having a layer containing the nonflammable solid electrolyte has been suggested (hereinafter, the layer is referred to as a "solid electrolyte layer" and the battery is referred to as a "solid battery".).

As a technique related to such a battery, Patent Document 1 for example discloses a non-aqueous secondary battery wherein an end face of a cathode active material layer is coated with an aggregation layer of insulating material particles; the cathode active material layer is formed in such a size that it does not overhang an anode active material layer paired therewith as a cell layer; and a separator interposed between the cathode active material layer and the anode active material layer is the aggregation layer of insulating material particles formed by bonding insulating material particles to each other by a binder and fixed to at least one of a cathode and an anode, and is disposed so as to cover at least an entire surface of the cathode active material layer opposed to the anode and so as not to overhang an end face of a current collector. In addition, Patent Document 2 discloses a non-aqueous electrolyte secondary battery wherein a resin permeation part formed by permeation of a nonionic permeable resin is arranged on an outer perimeter of an electrode reaction part effective for electrochemical reaction, in a planar direction of a cathode active material layer or an anode active material layer; and a peripheral edge of the electrode reaction part in the cathode active material layer matches or is positioned inside a peripheral edge of the electrode reaction part in the anode active material layer. Patent Document 2 also discloses a configuration in which an adhesion layer made of the nonionic permeable resin is arranged outside the cathode active material layer and/or the anode active material layer.

CITATION LIST

Patent Literature

Patent Document 1: International Publication No. 1998/38688

Patent Document 2: Japanese Patent Application Laid-Open No. 2010-92696

SUMMARY OF THE INVENTION

Problems to be Solved by the Invention

In a battery, when a laminated body having a cathode layer connected to a cathode current collector, an anode layer connected to an anode current collector, and a solid electrolyte layer disposed between the cathode layer and the anode layer is accommodated into a gas-impermeable exterior material and enclosed therein with the inside of the exterior material depresssurized in order to prevent the laminated body from being brought into contact with the air for example, a force is applied from the outside of the exterior material to the inside thereof. Herein, when the cathode layer, the solid electrolyte layer, and the anode layer are formed into such a size that end faces of the faces of the layers that take a lamination direction of each of the layers constituting the laminated body as the normal direction (hereinafter, the face being referred to as a "lamination face") are in line with one another and then these layers are laminated with one another, applying a force from a periphery of the laminated body is likely to cause an end of the cathode layer or an end of the anode layer (hereinafter referred to as "a part of an electrode layer") to fall and cause short circuit due to connection of the cathode layer and the anode layer to each other via the part of the electrode layer that have fallen. It is seen that this type of short circuit can be inhibited by making the size of the lamination face of the cathode layer and the size of the lamination face of the anode layer nonidentical and disposing the electrode layers in a manner that the electrode layer having a relatively smaller lamination face is arranged in the center of the other electrode layer having a relatively larger lamination face, as described in Patent Documents 1 and 2. However, in the technique disclosed in Patent Document 1, when the adhesion between the separator and the aggregation layer of insulating material particles is insufficient, it is likely that the cathode layer and the anode layer are connected to each other via the part of the cathode layer that has moved in a gap between the separator and the aggregation layer of insulating material particles and cause short circuit. Also in the technique disclosed in Patent Document 2, when the adhesion is poor between the cathode active material layer or the resin permeation part disposed on the outer perimeter of the cathode active material layer, and the anode active material layer or the resin permeation part and the adhesion layer disposed outside of the anode active material layer, it is likely that the cathode active material layer and the anode active material layer are connected to each other via the part of the cathode active material layer that has moved in a gap therebetween and cause short circuit. Since occurrence of such short circuit degrades the battery performance, development of a technique that can prevent the short circuit is required.

Accordingly, an object of the present invention is to provide a solid battery which can inhibit short circuit between electrodes.

Means for Solving the Problems

In order to solve the above problems, the present invention takes the following means.

That is, the present invention is a solid battery having a first electrode layer, a second electrode layer, and a solid electrolyte layer disposed between the first electrode layer and the second electrode layer, wherein a first insulating layer is disposed on an outer perimeter of the first electrode layer; a size of a lamination face of the first electrode layer is smaller than a size of a lamination face of the solid electrolyte layer, the lamination face taking a lamination direction of the first electrode layer, the solid electrolyte layer, and the second electrode layer as a normal direction; when viewed from the lamination direction, an outer edge of the solid electrolyte layer is positioned on the outer perimeter of the first electrode layer and an outer edge of the first insulating layer is positioned on an outer perimeter of the solid electrolyte layer; and the first electrode layer, the first insulating layer, and the solid electrolyte layer are disposed such that the outer edge of the first insulating layer and an end of the solid electrolyte layer are contacted with each other.

In the present invention, the "first electrode layer" and the "second electrode layer" is a cathode layer and an anode layer, respectively. In addition, the expression "when viewed from the lamination direction, an outer edge of the solid electrolyte layer is positioned on the outer perimeter of the first electrode layer and an outer edge of the first insulating layer is positioned on an outer perimeter of the solid electrolyte layer" means that the first electrode layer, the first insulating layer, and the solid electrolyte layer are laminated in a manner that the outer edge of the solid electrolyte layer which has a lamination face larger than that of the first electrode layer is located beyond the perimeter of the first electrode layer and the outer edge of the first insulating layer is located beyond the perimeter of the solid electrolyte, when viewed from the lamination direction.

In the present invention, a thickness of the first insulating layer is preferably no larger than a thickness of the first electrode layer.

In the present invention, a second insulating layer is preferably further disposed on an outer perimeter of the second electrode layer.

In the present invention described above in which the second insulating layer is further disposed on the outer perimeter of the second electrode layer, a thickness of the second insulating layer is preferably no larger than a thickness of the second electrode layer.

In the present invention described above, a size of the lamination face of the second electrode layer is preferably larger than a size of the lamination face of the first electrode layer; and when viewed from the lamination direction, an outer edge of the second electrode layer is preferably positioned on the outer perimeter of the first electrode layer.

Effects of the Invention

In the solid battery of the present invention, the outer edge of the solid electrolyte layer is positioned on the outer perimeter of the first electrode layer and the outer edge of the first insulating layer is positioned on the outer perimeter of the solid electrolyte layer, when viewed from the lamination direction; and the first electrode layer, the first insulating layer, and the solid electrolyte layer are disposed such that the outer edge of the first insulating layer and the end of the solid electrolyte layer are contacted with each other. Therefore, according to the battery of the present invention, even when an end of the first electrode layer chips off and falls, the part of the first electrode layer that has fallen can be held in a space defined by the first electrode layer, the first insulating layer, and the solid electrolyte layer. By holding the part of the electrode layer that has fallen in this space, it is possible to inhibit the short circuit caused by connection of the first electrode layer and the second electrode layer to each other via the part of the first electrode layer that has fallen. Therefore, according to the present invention, a solid battery which can inhibit short circuit between electrodes can be provided.

Additionally, in the present invention, with the thickness of the first insulating layer set to be no larger than the thickness of the first electrode layer, breaking of the solid electrolyte layer due to curving thereof can be inhibited. By inhibiting the breaking of the solid electrolyte layer, it is possible to prevent occurrence of the short circuit caused by connection of the first electrode layer and the second electrode layer to each other via the part of the first electrode layer that has entered a broken part of the solid electrolyte layer and/or the part of the second electrode layer that has entered a broken portion of the solid electrolyte layer. Therefore, with such a configuration, the short circuit between the electrodes can be inhibited easily.

In the present invention, with the second insulating layer further disposed on the outer perimeter of the second electrode layer, the short circuit between the first electrode layer and the second electrode layer can be inhibited easily.

In the present invention, with the thickness of the second insulating layer set to be no larger than the thickness of the second electrode layer, breaking of the solid electrolyte layer due to curving thereof can be inhibited. Therefore, with such a configuration, the short circuit between the electrodes can be inhibited easily.

In the present invention, with the size of the lamination face of the second electrode layer made larger than that of the first electrode layer, and with the outer edge of the second electrode layer positioned on the outer perimeter of the first electrode layer when viewed from the lamination direction, it is possible to easily inhibit the short circuit between the first electrode layer and the second electrode layer.

MODE FOR CARRYING OUT THE INVENTION

Hereinafter, a case in which the battery of the present invention is a lithium-ion secondary battery will be described with reference to the drawings. Herein, it should be noted that the embodiments shown below are examples of the present invention and that the present invention is not limited to these embodiments.

Figure 1:
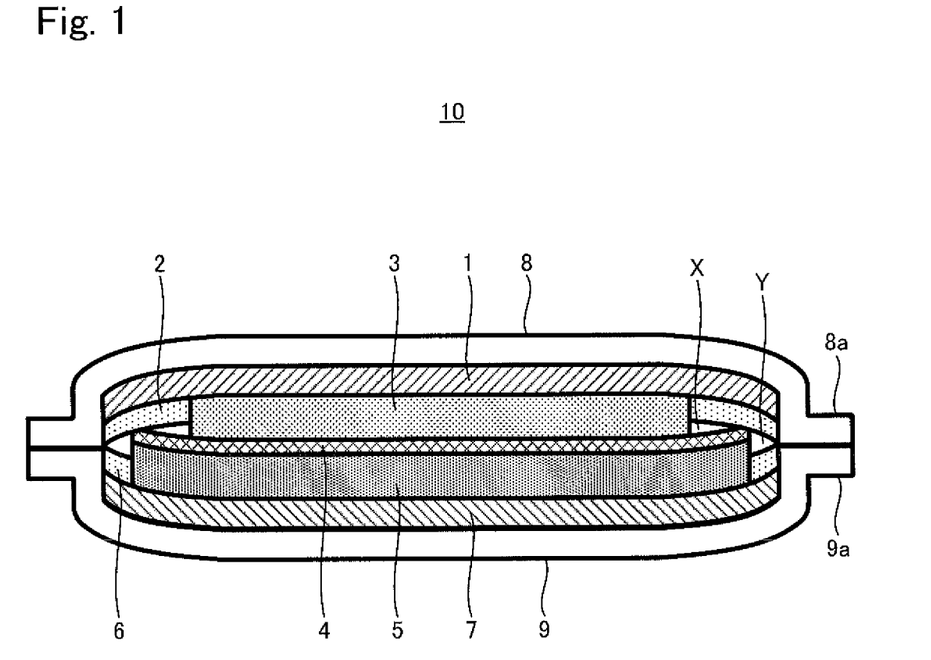
FIG. 1 is a cross-sectional view illustrating a solid battery 10.

FIG. 1 is a cross-sectional view illustrating a solid battery 10 of the present invention. FIGS. 2A to 2D are views illustrating manufacturing steps of the solid battery 10. The top/bottom direction of the drawing sheet of FIG. 1 and the back/front direction of the drawing sheets of FIGS. 2A to 2D are the lamination direction.

As shown in FIG. 1, the solid battery 10 has: a cathode current collector 1; a cathode layer 3 formed on a surface of the cathode current collector 1; a first insulating layer 2 disposed on an outer perimeter of the cathode layer 3; a solid electrolyte layer 4; an anode layer 5 disposed on an opposite side of the cathode layer 3 with the solid electrolyte layer 4 in the middle; a second insulating layer 6 disposed on an outer perimeter of the anode layer 5; an anode current collector 7 which is in contact with the anode layer 5 and the second insulating layer 6; and a first laminated film 8 and a second laminated film 9 which wrap them. In the solid battery 10, a lamination face of the cathode current collector 1 and a lamination face of the anode current collector 7 have substantially the same size and shape, the lamination face taking a lamination direction of the cathode layer 3, the solid electrolyte layer 4, the anode layer 5, etc. as the normal direction.

Figure 2A:
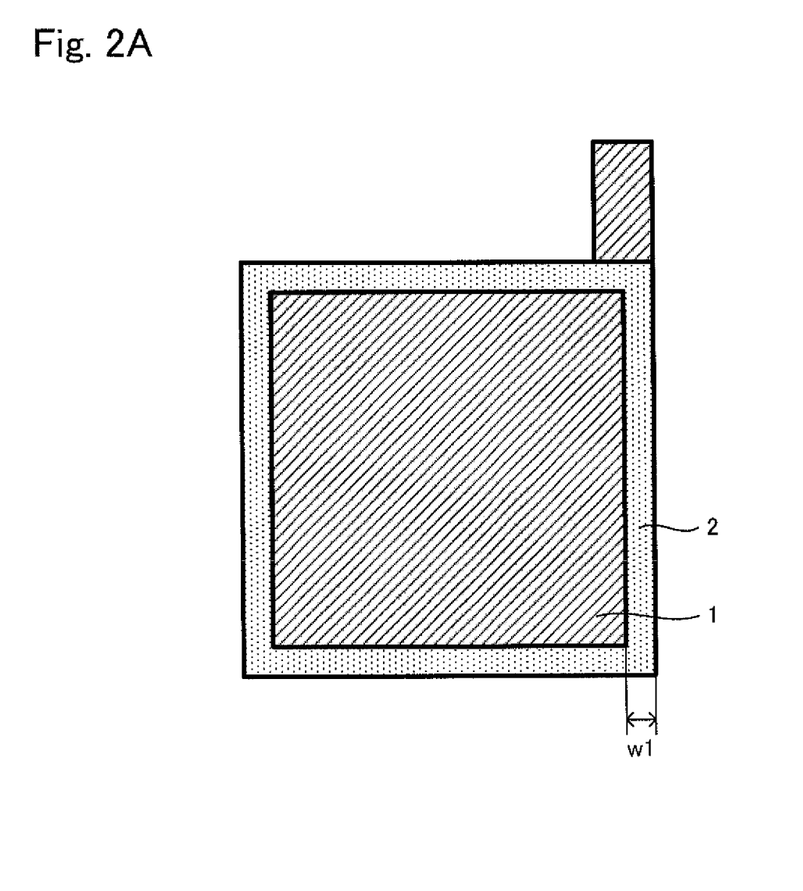
FIG. 2A is a view illustrating a cathode current collector 1 and a first insulating layer 2.
Figure 2B:
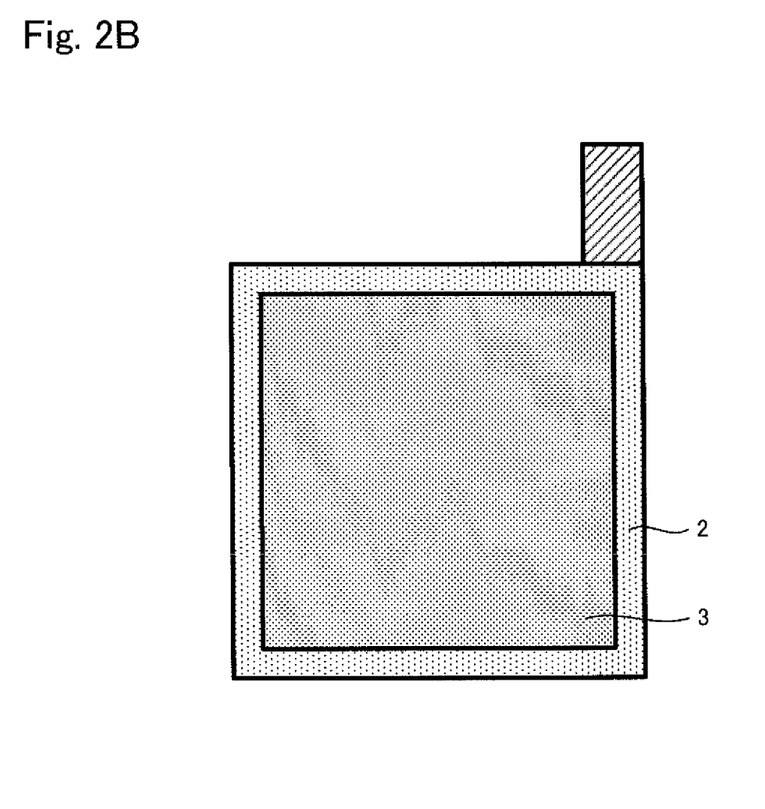
FIG. 2B is a view illustrating the first insulating layer 2 and a cathode layer 3.
Figure 3:
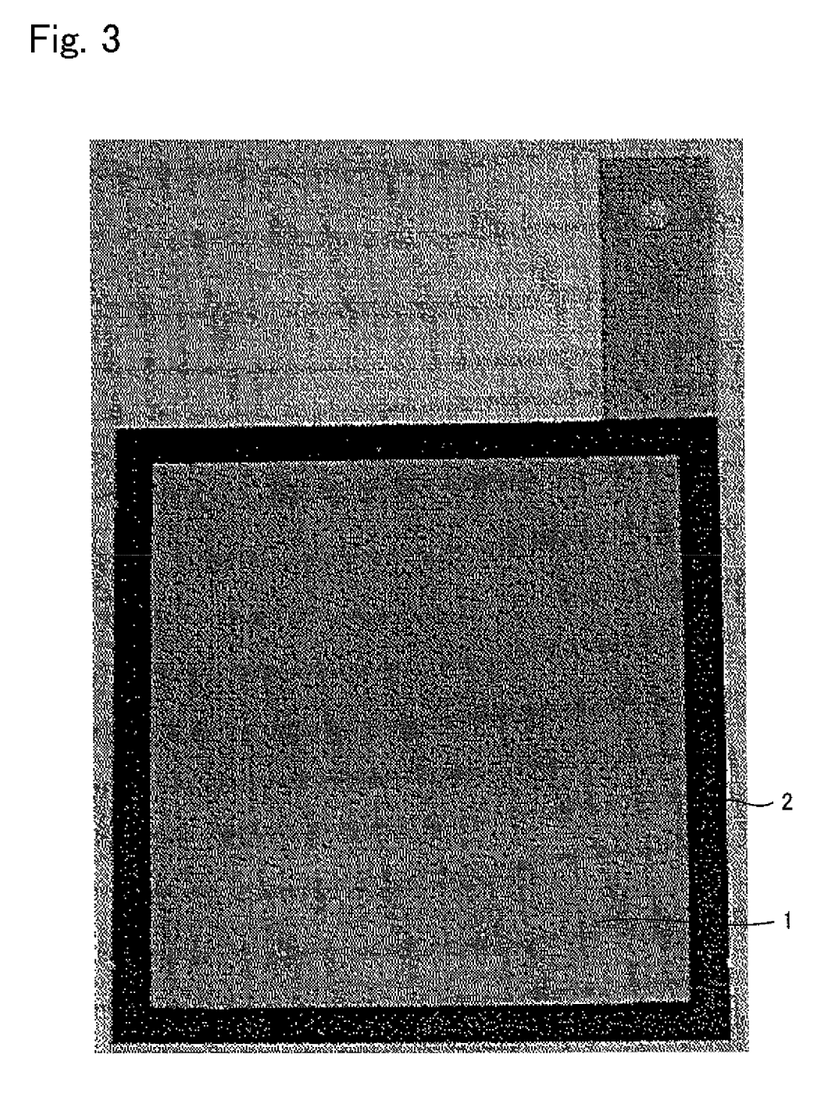
FIG. 3 is a photograph showing a sample of the current collector 1 having the first insulating layer 2 formed on an outer edge thereof.

The solid battery 10 is manufactured through the following steps for example. As shown in FIG. 2A, the first insulating layer 2 is formed on an outer edge of the cathode current collector 1 by a known method such as enamel coating and electrostatic coating. When the first insulating layer 2 is formed in this manner, a masking material is put on a surface of the first insulating layer 2. Then, the cathode layer 3 is formed as shown in FIG. 2B by applying a cathode slurry made by dispersing at least a cathode active material and a solid electrolyte into a solvent on an entire surface of the cathode current collector 1 surrounded by the first insulating layer 2 by a known method such as a doctor blade method, and volatilizing the solvent. Herein, the thickness (the thickness in the back/front direction of the drawing sheet of FIG. 2B) of the cathode layer 3 is made about several micrometers larger than the thickness (the thickness in the back/front direction of the drawing sheet of FIG. 2B) of the first insulating layer 2. By forming the first insulating layer 2 and the cathode layer 3 in this manner, it is possible to dispose the first insulating layer 2 on an outer perimeter of the cathode layer 3. FIG. 3 shows a sample of the cathode current collector 1 having the first insulating layer 2 formed on the outer edge thereof. The first insulating layer 2 shown in FIG. 3 is made to have a thickness of 25 μm in the back/front direction of the drawing sheet of FIG. 3.

Figure 2C:
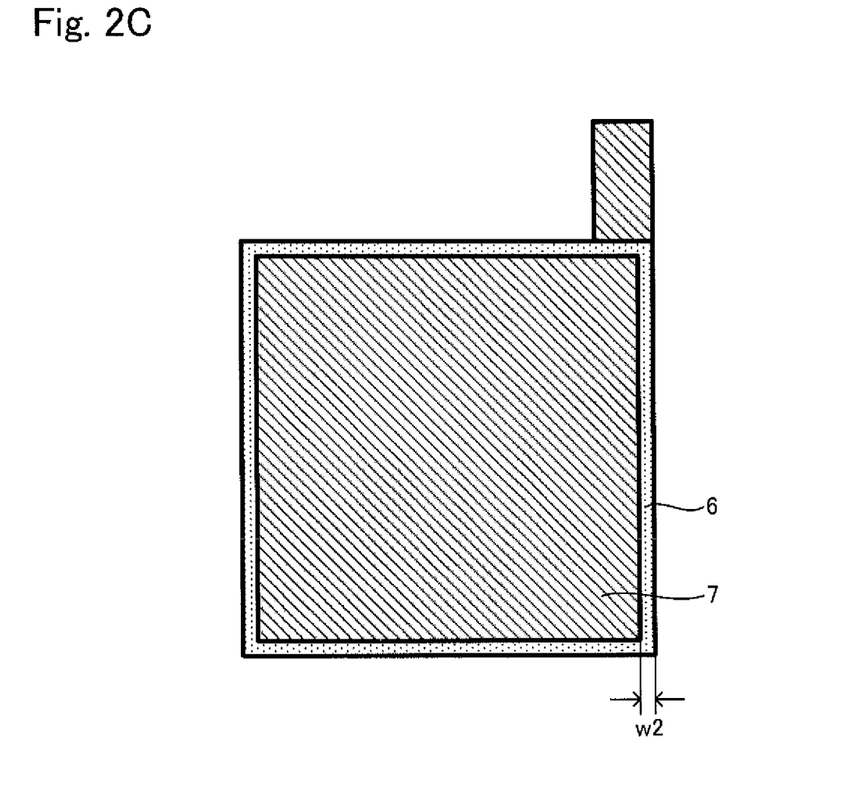
FIG. 2C is a view illustrating a second insulating layer 6 and an anode current collector 7.
Figure 2D:
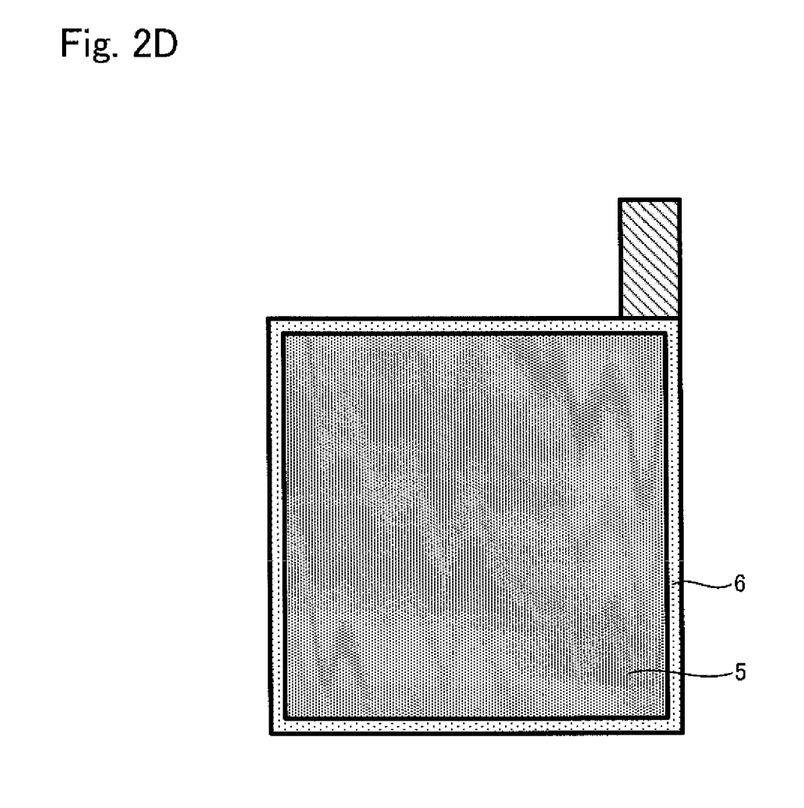
FIG. 2D is a view illustrating an anode layer 5 and the second insulating layer 6.
Figure 4:
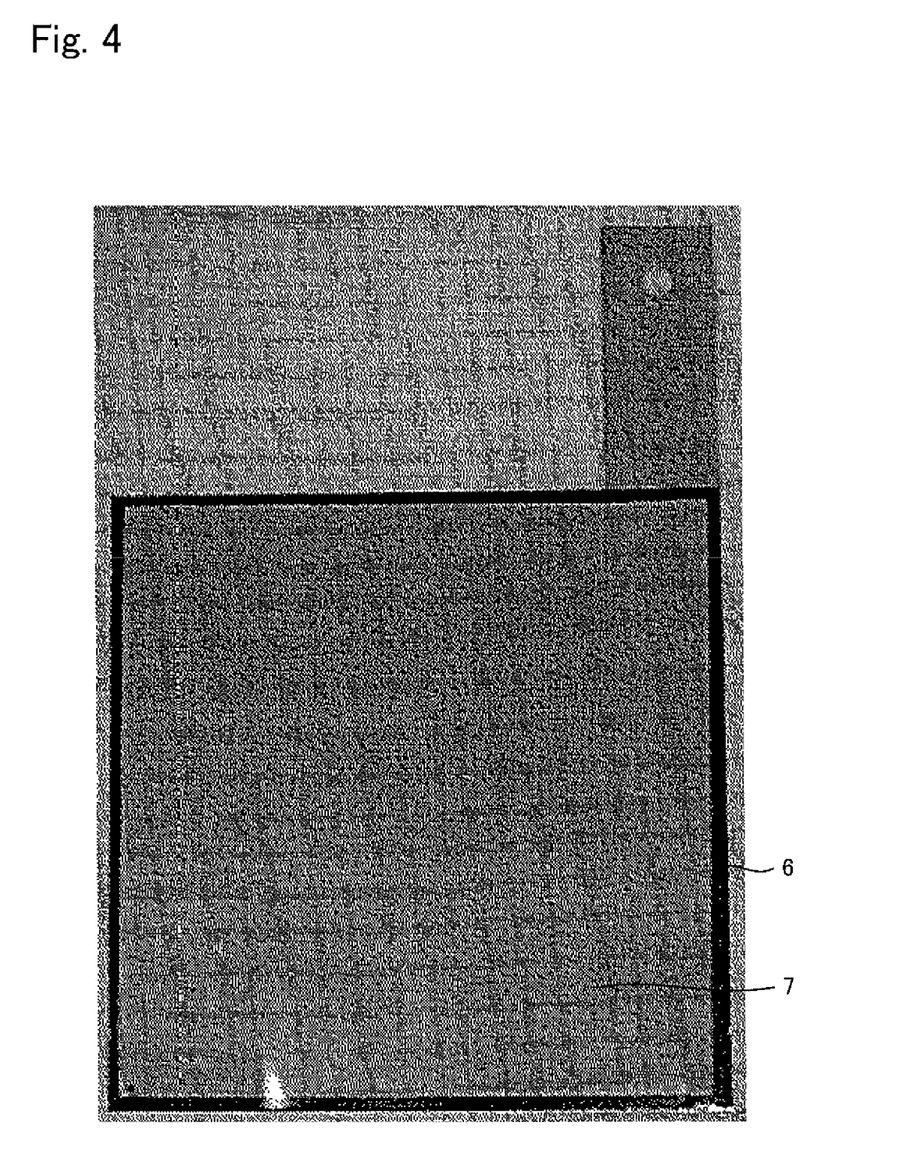
FIG. 4 is a photograph showing a sample of the anode collector 7 having the second insulating layer 6 formed on an outer edge thereof.

On the other hand, as shown in FIG. 2C, the second insulating layer 6 is formed on an outer edge of the anode current collector 7 by a known method such as enamel coating and electrostatic coating for example. Herein, the width w2 of the second insulating layer 6 shown in FIG. 20 is made smaller than the width w1 of the first insulating layer 2 shown in FIG. 2A. When the second insulating layer 6 is formed in this manner, a masking material is put on a surface of the second insulating layer 6. Then, the anode layer 5 is formed as shown in FIG. 2D by applying an anode slurry made by dispersing at least an anode active material and a solid electrolyte into a solvent on an entire surface of the anode current collector 7 surrounded by the second insulating layer 6 by a known method such as a doctor blade method, and volatilizing the solvent. Herein, the thickness (the thickness in the back/front direction of the drawing sheet of FIG. 2D) of the anode layer 5 is made about several micrometers larger than the thickness (the thickness in the back/front direction of the drawing sheet of FIG. 2D) of the second insulating layer 6. By forming the anode layer 5 and the second insulating layer 6 in this manner, it is possible to dispose the second insulating layer 6 on an outer perimeter of the anode layer 5. FIG. 4 shows a sample of the anode current collector 7 having the second insulating layer 6 formed on the outer edge thereof. The second insulating layer 6 shown in FIG. 4 is made to have a thickness of 25 μm in the back/front direction of the drawing sheet of FIG. 4.

When the anode layer 5 and the second insulating layer 6 are formed in this manner, an electrolyte slurry made by dispersing at least a solid electrolyte into a solvent is applied on a surface of the anode layer 5 by a known method such as a doctor blade method with the masking material put on the surface of the second insulating layer 6, and the solvent is volatilized. Thereby the solid electrolyte layer 4 having a lamination face whose size and shape are the same as those of the anode layer 5 can be formed. Then, after the masking material is removed, the cathode layer 3 formed on the surface of the cathode current collector 1 surrounded by the first insulating layer 2 is disposed on the solid electrolyte layer 4 to thereby make a laminated body having the solid electrolyte layer 4 sandwiched by the cathode layer 3 and the anode layer 5, and a predetermined compressive force is applied in the lamination direction of the laminated body to press the laminated body. Thereafter, the laminated body that has been pressed is wrapped with the first laminated film 8 and the second laminated film 9. Next, the space surrounded by the first laminated film 8 and the second laminated film 9 is depressurized (vacuum lamination), and an outer edge 8a of the first laminated film 8 and an outer edge 9a of the second laminated film 9 are thermally adhered to each other for example. Through these steps, the solid battery 10 can be produced.

The solid battery 10 produced in this manner has the outer edge of the solid electrolyte layer 4 positioned on the outer perimeter of the cathode layer 3 and the outer edge of the first insulating layer 2 positioned on the outer perimeter of the solid electrolyte layer 4 when viewed from the lamination direction. When vacuum lamination is performed on the laminated body structured in this manner, a force is applied from the outside of the laminated film to the inside thereof and especially the outer edge of the laminated body is caused to curve. As a result, the outer edge of the first insulating layer 2 and the end of the solid electrolyte layer 4 that have curved contact with each other along the entire perimeter, thereby enabling a portion X defined by the cathode layer 3, the first insulating layer 2, and the solid electrolyte layer 4 to be provided around the perimeter of the cathode layer 3. Then, a portion Y defined by the anode layer 5, the solid electrolyte layer 4, the first insulating layer 2, and the second insulating layer 6 can be separated from the portion X by the first insulating layer 2 and the solid electrolyte layer 4 that are closely contacted with each other along the entire perimeter.

In the solid battery 10 configured in this manner, even when a part of the outer edge of the cathode layer 3 chips off due to the force applied from the outside of the laminated films 8 and 9, etc., and the part of the cathode layer that has chipped off falls, the part of the cathode layer that has fallen can be held in the portion X. Therefore, it is possible to prevent occurrence of the short circuit caused by connection of the cathode layer 3 and the anode layer 5 to each other via the part of the cathode layer 3 that has fallen. Further, even when a part of the outer edge of the anode layer 5 chips off due to the force applied from the outside of the laminated films 8 and 9, etc., and the part of the anode layer 5 falls, the part of the anode layer 5 that has fallen can be held in the portion Y. Therefore, it is possible to prevent occurrence of the short circuit caused by connection of the cathode layer 3 and the anode layer 5 to each other via the part of the anode layer 5 that has fallen.

Additionally, in the solid battery 10, the thickness of the first insulating layer 2 is about several micrometers smaller than that of the cathode layer 3, and the thickness of the second insulating layer 6 is about several micrometers smaller than that of the anode layer 5. With the first insulating layer 2 and the second insulating layer 6 having such a thickness, the outer edge of the first insulating layer 2 and the outer edge of the second insulating layer 6 can be easily contacted with each other. With the outer edge of the first insulating layer 2 and the second insulating layer 6 contacted with each other, even when a force is applied from the outside of the laminated films 8 and 9, a part of the force can be received in the contact portion of the outer edge of the first insulating layer 2 and the outer edge of the second insulating layer 6. As a result, it is possible to reduce the degree to which the anode current collector 7 curves. By reducing the degree to which the anode current collector 7 curves, it is possible to prevent the solid electrolyte layer 4 from breaking in the boundary between the cathode layer 3 and the portion X where the stress is largest. Herein, if the solid electrolyte layer 4 breaks, the cathode layer 3 and the anode layer 5 may be connected to each other via the part of the cathode layer 3 that has entered the crack of the solid electrolyte layer 4 in a case when the solid electrolyte layer 4 breaks from the cathode layer 3 side or via the part of the anode layer 5 that has entered the crack of the solid electrolyte layer 4 in a case when the solid electrolyte layer 4 breaks from the anode layer 5 side, resulting in short circuit. In contrast, in the solid battery 10, since breaking of the solid electrolyte layer 4 can be prevented, it is possible to prevent occurrence of the short circuit via the part of the cathode layer 3 or the part of the anode layer 5 that has entered the crack of the solid electrolyte layer 4.

In the solid battery 10, the cathode current collector 1 and the anode current collector 7 may be constituted by a known conductive material that can be used as a cathode current collector and an anode current collector of a lithium-ion secondary battery. Examples of such a conductive material are metal materials containing one or more elements selected from the group consisting of Cu, Ni, Al, V, Au, Pt, Mg, Fe, Ti, Co, Cr, Zn, Ce, and In. In addition, the cathode current collector 1 and the anode current collector 7 may be formed into a shape of a metal foil, a metal mesh, or the like.

The first insulating layer 2 and the second insulating layer 6 may be constituted by a known insulating material that can endure the environment in which the solid battery 10 is used. Examples of such an insulating material include polytetrafluoroethylene, polyamide imide, polypropylene (PP), and mixtures of two or more thereof.

As the cathode active material to be contained in the cathode layer 3, a known active material that can be contained in a cathode layer of a lithium-ion secondary battery may be adequately employed. Examples of such a cathode active material include lithium cobalt oxide ($LiCoO_2$). As the electrolyte to be contained in the cathode layer 3, a known electrolyte that can be contained in a cathode layer of a lithium-ion secondary battery may be adequately employed. Examples of such an electrolyte include: inorganic solid electrolytes including oxide solid electrolytes such as $Li_3PC_4$, $Li_3PS_4$, and sulfide solid electrolytes made by mixing $Li_2S$ and $P_2S_5$ such that the ratio thereof is $Li_2S:P_2S_5=50:50$ to $100:0$ (for example sulfide solid electrolytes made by mixing $Li_2S$ and $P_2S_5$ such that the ratio thereof is $Li_2S:P_2S_5=75:25$ at a mass ratio); and organic solid electrolytes such as polyethylene oxide. In addition, the cathode layer 3 may contain a binder to bind the cathode active material and the electrolyte and a conductive material to improve the conductivity. Examples of the binder that can be contained in the cathode layer 3 include butylene rubber. Examples of the conductive material that can be contained in the cathode layer 3 include carbon black. In addition, as the solvent to be used in making the cathode layer 3, a known solvent that can be used in preparing a slurry for making a cathode layer of a lithium-ion secondary battery may be adequately employed. Examples of such a solvent include heptane.

Examples of the electrolyte to be contained in the solid electrolyte layer 4 include the above described inorganic solid electrolytes and organic solid electrolytes that can be contained in the cathode layer 3. In addition, examples of the solvent to be used in making the solid electrolyte layer 4 include the above described solvent that can be used in making the cathode layer 3.

As the anode active material to be contained in the anode layer 5, a known active material that can be contained in an anode layer of a lithium-ion secondary battery may be adequately employed. Examples of such an active material include graphite. As the electrolyte to be contained in the anode layer 5, a known electrolyte that can be contained in an anode layer of a lithium-ion secondary battery may be adequately employed. Examples of such an electrolyte include the above described inorganic solid electrolytes and organic solid electrolytes that can be contained in the cathode layer 3. In addition, the anode layer 5 may contain a binder to bind the anode active material and the electrolyte and a conductive material to improve the conductivity. Examples of the binder and the conductive material that can be contained in the anode layer 5 include the above described binder and conductive material that can be contained in the cathode layer 3. In addition, examples of the solvent to be used in making the anode layer 5 include the above described solvent that can be used in making the cathode layer 3.

As the first laminated film 8 and the second laminated film 9, a film that can endure the environment in which the lithium-ion secondary battery is used, does not allow permeation of gas or liquid, and can be sealed tightly may be employed without particular limitations. Examples of a constituent material of such a film include films having a surface of aluminum coated with polypropylene (PP).

In the above descriptions of the present invention, the configuration has been shown in which the thickness of the first insulating layer 2 is about several micrometers smaller than the thickness of the cathode layer 3; however, the solid battery of the present invention is not limited to this configuration. In the solid battery of the present invention, the first insulating layer and the first electrode layer (the cathode layer 3 in the solid battery 10; the same shall apply hereinafter.) may have the same thickness, or the first insulating layer may be thicker than the first electrode layer. However, the thickness of the first insulating layer is preferably no larger than that of the first electrode layer in view of making the solid electrolyte layer hard to break and thereby easily preventing the short circuit caused via the part of the electrode layer that has entered the crack of the solid electrolyte layer, and so on.

In the above descriptions of the present invention, the configuration has also been shown in which the first insulating layer 2 is disposed on the outer perimeter of the cathode layer 3 and the second insulating layer 6 is disposed on the outer perimeter of the anode layer 5; however, the solid battery of the present invention is not limited to this configuration. The solid battery of the present invention may be configured such that the second insulating layer is not disposed on the outer perimeter of the second electrode layer (the anode layer 5 in the solid battery 10; the same shall apply hereinafter.) However, in order to easily inhibit the short circuit between the first electrode layer and the second electrode layer, and so on, it is preferable to dispose the second insulating layer on the outer perimeter of the second electrode layer.

In the above descriptions of the present invention, the configuration has also been shown in which the thickness of the second insulating layer 6 is about several micrometers smaller than that of the anode layer 5; however, the solid battery of the present invention is not limited to this configuration. In the solid battery of the present invention, when the second insulating layer is disposed on the outer perimeter of the second electrode layer, the second insulating layer and the second electrode layer may have the same thickness, or the second insulating layer may be thicker than the second electrode layer. However, the thickness of the second insulating layer is preferably no larger than that of the second electrode layer in view of making the solid electrolyte layer hard to break and thereby easily preventing the short circuit caused via the part of the electrode layer that has entered the crack of the solid electrolyte layer, and so on.

In the descriptions of the present invention, the configuration has also been shown in which the width w2 of the second insulating layer 6 is made smaller than the width w1 of the first insulating layer 5 and thereby the size of the lamination face of the anode layer 5 is made larger than that of the cathode layer 3 and the outer edge of the anode layer 5 is positioned on the outer perimeter of the cathode layer 3 when viewed from the lamination direction. However, the solid battery of the present invention is not limited to this configuration. In the solid battery of the present invention, the size of the lamination face of the cathode layer and the size of the lamination face of the anode layer may be the same, or the size of the lamination face of the cathode layer may be larger than that of the anode layer. However, in order to inhibit the short circuit between the electrode layers and provide a solid battery with easily improved performance, it is preferable to make the lamination face of the anode layer larger than that of the cathode layer and dispose the cathode layer and the anode layer such that the outer edge of the anode layer is positioned on the outer perimeter of the cathode layer when viewed from the lamination direction.

In the above descriptions of the present invention, the solid battery 10 being a lithium-ion secondary battery of the present invention has been shown; however, the solid battery of the present invention is not limited to this configuration. The solid battery of the present invention may be configured such that ions other than lithium ions move between the first electrode layer and the second electrode layer. Examples of such ions include a sodium ion and a potassium ion. When the configuration in which ions other than lithium ions move is adopted, the cathode active material, the solid electrolyte, and the anode active material may be selected depending on the ions to move.

The present invention has been described above as to the embodiment which is supposed to be practical as well as preferable at present. However, it should be understood that the present invention is not limited to the embodiment disclosed in the specification of the present application and can be appropriately modified within the range that does not depart from the gist or spirit of the invention, which can be read from the appended claims and the overall specification, and that a solid battery with such modifications is also encompassed within the technical range of the present invention.

DESCRIPTION OF THE REFERENCE NUMERALS 1 cathode current collector
2 first insulating layer
3 cathode layer (first electrode layer)
4 solid electrolyte layer (electrolyte layer)
5 anode layer (second electrode layer)
6 second insulating layer
7 anode current collector
8 first laminated film
9 second laminated film
10 solid battery

The invention claimed is:

1. A solid battery comprising:
a first current collector having a surface and an outer edge;
a second current collector having a surface;
a first electrode layer provided on the surface of the first current collector, the first electrode layer having an outer perimeter and a lamination face;
a second electrode layer provided on the surface of the second current collector;
a solid electrolyte layer disposed between the first electrode layer and the second electrode layer, the solid electrolyte layer having an outer edge, an outer perimeter, an end and a lamination face;
a first insulating layer disposed on the outer perimeter of the first electrode layer and on the outer edge of the first current collector, the first insulating layer have an outer edge; and
a space formed by outer surfaces of the first electrode layer, the first insulating layer and the solid electrolyte layer, the space being void of any material,
wherein a size of the lamination face of the first electrode layer is smaller than a size of the lamination face of the solid electrolyte layer, the lamination faces taking a lamination direction of the first electrode layer, the solid electrolyte layer, and the second electrode layer as a normal direction,
when viewed from the lamination direction, the outer edge of the solid electrolyte layer is positioned on the outer perimeter of the first electrode layer and the outer edge of the first insulating layer is positioned on the outer perimeter of the solid electrolyte layer,
the first electrode layer, the first insulating layer, and the solid electrolyte layer are disposed such that the outer edge of the first insulating layer and the end of the solid electrolyte layer are in contact with each other, and
a thickness of the first insulating layer is smaller than a thickness of the first electrode layer.

2. The solid battery according to claim 1, further comprising a second insulating layer disposed on an outer perimeter of the second electrode layer and on an outer edge of the second current collector.

3. The solid battery according to claim 2, wherein a thickness of the second insulating layer is no larger than a thickness of the second electrode layer.

4. The solid battery according to claim 1, wherein a size of a lamination face of the second electrode layer is larger than the size of the lamination face of the first electrode layer, and
   when viewed from the lamination direction, an outer edge of the second electrode layer is positioned on the outer perimeter of the first electrode layer.

5. The solid battery according to claim 2, wherein a size of a lamination face of the second electrode layer is larger than the size of the lamination face of the first electrode layer, and
   when viewed from the lamination direction, an outer edge of the second electrode layer is positioned on the outer perimeter of the first electrode layer.

6. The solid battery according to claim 3, wherein a size of a lamination face of the second electrode layer is larger than the size of the lamination face of the first electrode layer, and
   when viewed from the lamination direction, an outer edge of the second electrode layer is positioned on the outer perimeter of the first electrode layer.

\* \* \* \* \*